United States Patent [19]
Amemiya

[11] 3,979,599
[45] Sept. 7, 1976

[54] OPERATIVELY INTERLOCKED ELECTRONIC SYSTEM

[75] Inventor: Yoshio Amemiya, Yokohama, Japan

[73] Assignee: Hitachi, Ltd., Japan

[22] Filed: May 5, 1975

[21] Appl. No.: 574,454

[30] Foreign Application Priority Data
May 10, 1974 Japan................................ 49-52033

[52] U.S. Cl............................. 307/29; 178/DIG. 11
[51] Int. Cl.² ............................................ H02J 3/00
[58] Field of Search ................... 307/29, 11, 31, 37,
307/38, 39, 41, 43, 85, 86, 155, 157, 112,
113, 114, 115, 116; 178/DIG. 11, DIG. 15;
179/1 PC, 2 A; 325/492; 317/137

[56] References Cited
UNITED STATES PATENTS
3,603,732  9/1971  George ............................. 325/492

Primary Examiner—Robert K. Schaefer
Assistant Examiner—Morris Ginsburg
Attorney, Agent, or Firm—Craig & Antonelli

[57] ABSTRACT

A first electronic apparatus is provided with a relay energized at a low voltage, the relay having a contact connected in parallel with a power supply switch for the first electronic apparatus. The first electronic apparatus is further provided with a signal generator circuit for energizing a second electronic apparatus. An output signal generated from a third signal generator circuit of a third electronic apparatus is applied to the coil of the relay of the first electronic apparatus thereby to operatively interlock the first electronic apparatus with the third electronic apparatus. Alternatively, an output signal generated from a signal generator circuit of the first electronic apparatus is applied to a relay of the second electronic apparatus having a contact through which power is supplied to the second electronic apparatus, thereby operatively interlocking the second electronic apparatus with the first electronic apparatus.

5 Claims, 6 Drawing Figures

OPERATIVELY INTERLOCKED ELECTRONIC SYSTEM

This invention relates to an operatively interlocked electronic system whereby a television receiver, a stereophonic amplifier, a tape recorder, a VTR and other electronic apparatuses are capable of being operatively interlocked.

The conventional interlocked electronic system undergoes various inconveniencies as will be described later with reference to the accompanying drawings.

An object of the present invention is to provide an operatively interlocked electronic system in which one electronic apparatus is either operatively interlocked with other electronic apparatus or operated independently of the other electronic apparatus as desired.

Another object of the invention is to provide an operatively interlocked electronic system in which a couple of electronic apparatuses are capable of being operatively interlocked with each other by interchanging a small electric power therebetween.

Still another object of the invention is to provide an operatively interlocked electronic system in which the switching of the power supply is easily and safely capable of being subjected to remote control.

A further object of the invention is to provide an operatively interlocked electronic system in which a cathode-ray tube, if any, of an electronic apparatus is capable of being maintained in preheated state.

In order to achieve the above-described objects of the invention, the operatively-interlocked electronic system according to the present invention comprises: a first electronic apparatus including a first AC power supply, a rectifier circuit to which electric power is supplied from the first AC power supply, a first load circuit to which the output of the rectifier circuit is applied, a manual power switch inserted in the line connecting the first AC power supply to the first load circuit through the rectifier circuit, and a signal generator circuit connected to the first AC power supply for decreasing the voltage of the AC power supply and generating a control signal; a second electronic apparatus including a second power supply, a second load circuit and an automatic switch inserted between the second power supply and the second load circuit; means for applying the output signal from the signal generator circuit to the automatic switch when the manual power switch is closed; and means for supplying electric power from the second power supply to the second load circuit by closing the automatic switch in response to the control signal.

In the accompanying drawings:

FIG. 3 is a schematic diagram showing the connecting device for connecting the input terminal section and the output terminal section of a power supply driving a relay;

FIG. 4 is a schematic diagram showing the connecting device for connecting the input terminal section and the output terminal section for the purpose of remote control of the operatively interlocked electronic system shown in FIG. 2;

FIG. 5 is a schematic diagram showing a voltage introducing device for collecting a voltage from the power supply driving the relay and FIG. 6 is a circuit diagram showing another example of one of the electronic apparatuses included in the operatively-interlocked electronic system shown in FIG. 2.

Figure 1:
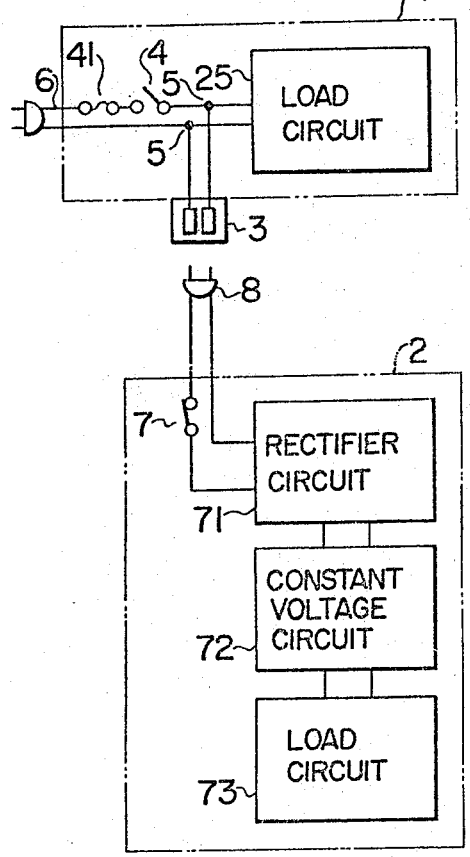
FIG. 1 is a circuit diagram showing an example of the interlocking between a conventional stereophonic amplifier with a switched plug socket and a television receiver.

The conventional connection of typical electronic acoustic apparatuses such as the television receiver and the stereophonic amplifier is as shown in FIG. 1. In this drawing, reference numeral 1 shows a stereophonic amplifier, numeral 2 a television receiver including a rectifier circuit 71, a constant voltage circuit 72 and a load circuit 73, numeral 3 a switched plug socket for the stereophonic amplifier 1, numeral 4 a manual power switch, numeral 41 a fuse, and numerals 5, 5 junction points provided inwardly of the fuse 41 and to which the switched plug socket 3 is connected.

Numeral 25 shows a load circuit for the stereophonic amplifier 1, numeral 6 power cords for the stereophonic amplifier 1 which is connected to a house-service power supply, numeral 7 a power switch for the television receiver 2, and numeral 8 a power plug for the television receiver 2.

When the power plug 8 is kept inserted in the switched plug socket 3 with the power switch 7 for the television receiver 2 closed, the stereophonic amplifier 1 is operatively interlocked with the television receiver 2 by opening and closing the power switch 4 of the stereophonic amplifier 1.

It often happens, however, that general users connect an electronic apparatus of large power consumption to the switched plug socket 3 provided for the stereophonic amplifier 1, without the knowledge of the allowable power of the switched plug socket 3, resulting in the fuse 41 of the stereophonic amplifier 1 being blown out.

Also, in some color television receivers, a rush current several ten times the steady-state current flows, so that the fuse 41 is likely to blow out or the switch 4 fail when the color television receiver is connected to the switched plug socket 3.

In the state where the power plug 8 for the television receiver 2 is inserted in the switched plug socket 3 of the stereophonic amplifier 1, the independent operation of the television receiver 2 is impossible. If the television receiver 2 is to be operated independently, the power circuit for the stereophonic amplifier 1 must be inconveniently closed.

In view of the fact that the stereophonic amplifier 1 but not the television receiver 2 is generally provided with the switched plug socket 3, the interlocked operation is impossible for energizing the stereophonic amplifier 1 by closing the power switch 7 for the television receiver 2.

Further, in the case where it is desired to operate the stereophonic amplifier 1 and the television receiver 2 at a remote point from the power supply, a switch is required to be inserted in the middle of a lengthened power cord. The lengthening and connecting the switch as above by general users lacking the correct knowledge of the electricity is very dangerous as it often leads to a case of electric shock or a fire.

Still another disadvantage of the above-mentioned conventional system is apparent in the interlocked operation of a television receiver or other apparatus having a cathode-ray tube with a different type of electronic apparatus, in which case the absence of the preray tube 50 or to an indication lamp not shown in the drawing. The secondary coil 133 is connected to an input terminal of the rectifier circuit 119, the other input terminal of which is grounded. The primary coil 131 and the secondary coil 133 of the transformer 13 and the rectifier circuit 119 make up the signal generator circuit 199. One output terminal of the rectifier circuit 119 is grounded and the other output terminal thereof is connected through the parallelconnected switches 18 and 15A and the contact 107 to the terminal 211 of the output terminal section 21, the terminal 212 being grounded. The secondary coil 132 is connected through the switch 115 to the rectifier circuit 14, the output voltage of which is applied through the smoothing circuit 141 and the constant voltage circuit 142 to the load circuit 256.

Figure 2:
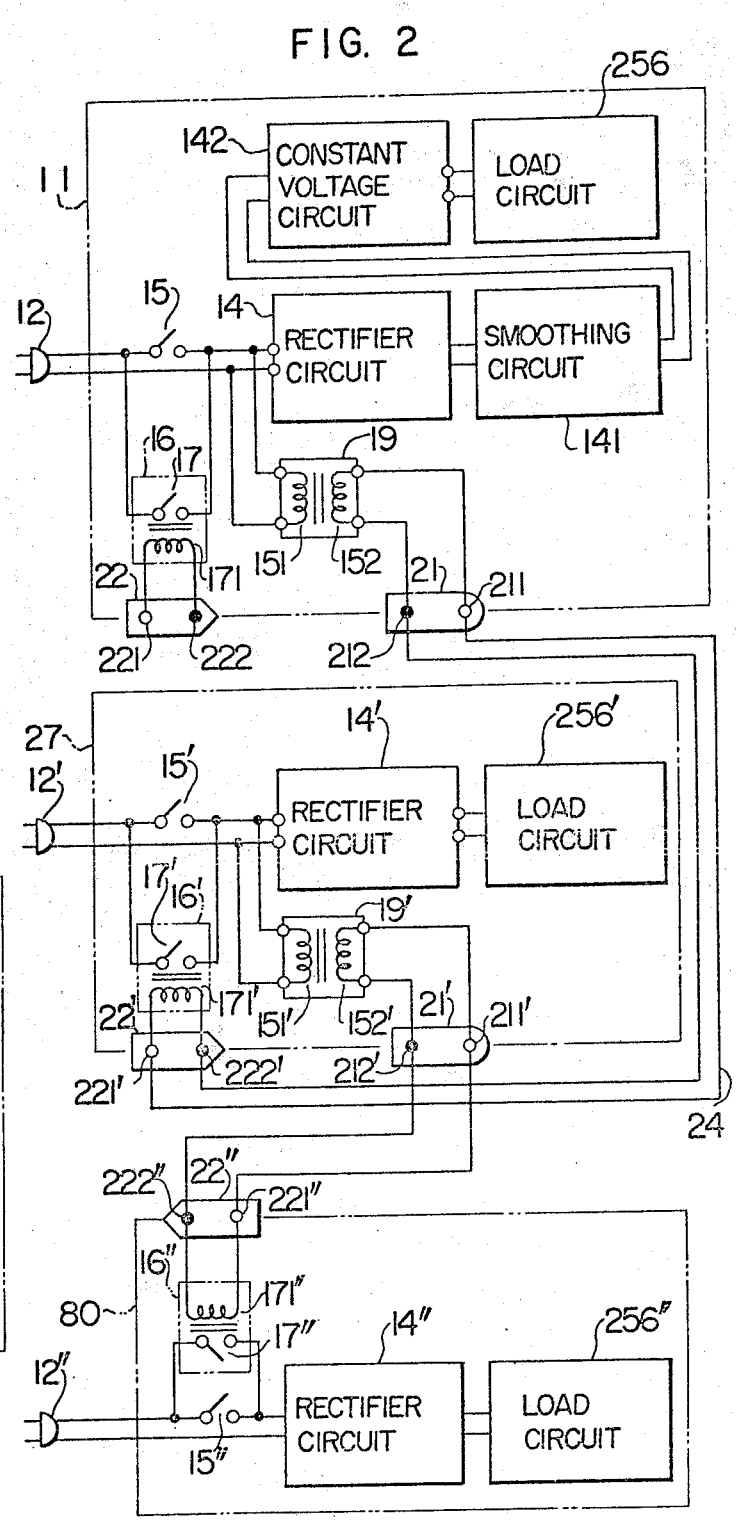
FIG. 2 is a circuit diagram showing the operatively interlocked electronic system according to an embodiment of the present invention.

The contact 117 of the relay 116 is connected in parallel to the switch 115, while one terminal of the coil 100 of the relay 116 is connected to the terminal 221 of the input terminal section 22, the other terminal thereof being connected to the grounded terminal 222. In this case, the signal obtained at the output terminal 21 is a DC voltage and therefore the relay of the electronic apparatus interlocked with the television receiver 11 must be such as to be energized by a DC voltage instead of an AC voltage unlike the relays 16, 16' and 16'' of FIG. 2.

By the operation of the interlocked switches 115 and 15A, the interlocked operation of the other electronic apparatus having a relay supplied with a signal from the terminal section 21 is made possible.

In interlocking the operation of the television receiver 11 by the operation of the other electronic apparatus, a signal generated by closing the power switch of the other electronic apparatus is applied to the input terminal section 22. In this way, the television receiver 11 is operatively interlocked with the other electronic apparatus.

At the same time, if there is any electronic apparatus supplied with a control signal from the terminal section 21, that particular electronic apparatus is also capable of being operatively interlocked. In the case where the actuation of the television receiver 11 is desired without actuating the other electronic apparatus supplying a signal to the terminal section 22, the closing of the power switch 115 suffices.

Figures 3, 4, 5, 6:
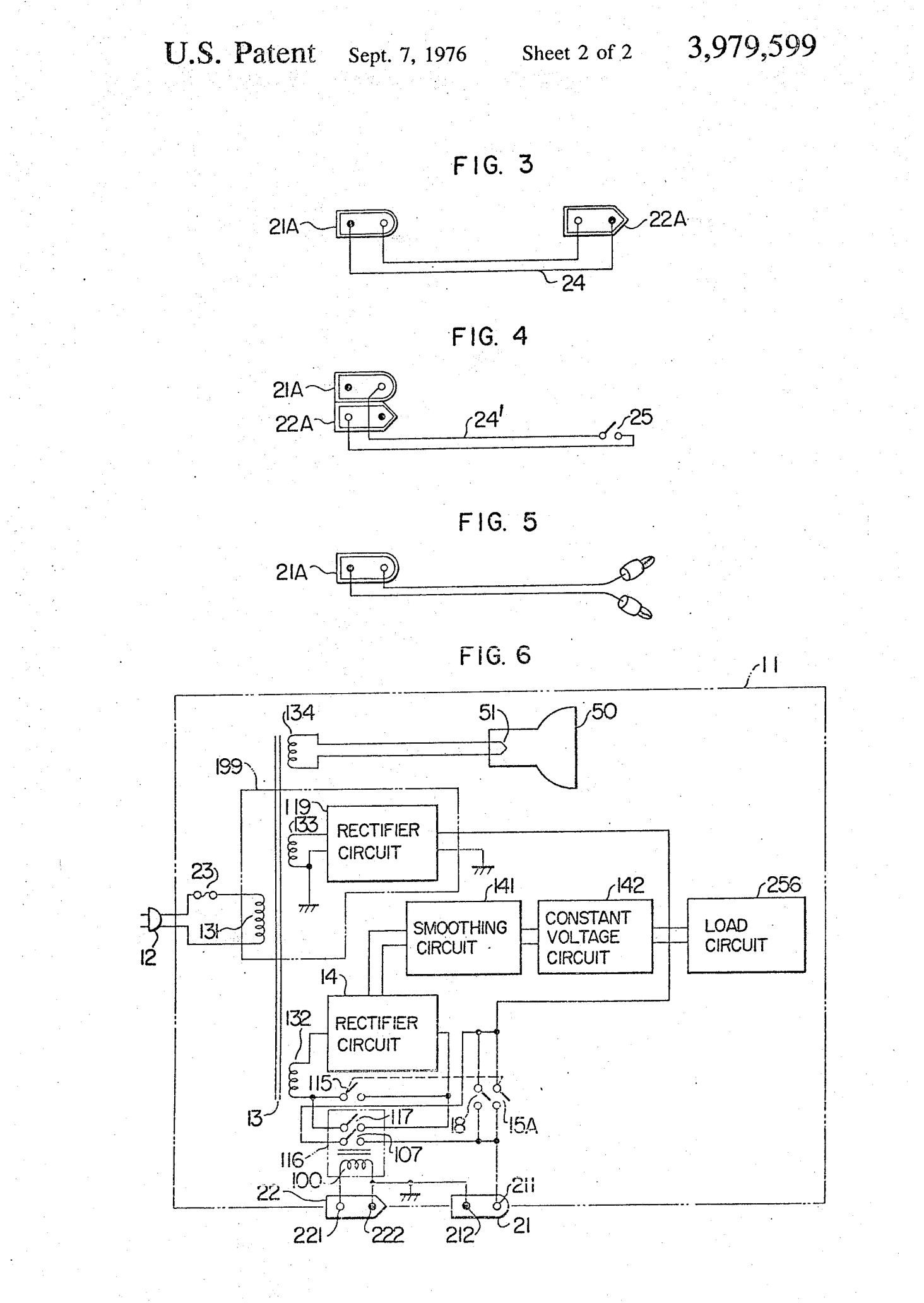

If the switch 18, is closed and the connectors 21A and 22A of the connecting device shown in FIG. 4 are connected to the terminals 21 and 22, the television receiver 11 may be subjected to remote control by means of the switch 25.

In generally used television receivers in which the filament of the cathode-ray tube is kept turned on in preparation for instantaneous energization, a power supply is required regardless of the power switch and the instantaneous energization is impossible by the use of the switched plug socket. By providing a power switch 117 on the secondary coil 132 side of the transformer 13 as shown in FIG. 6, however, the instantaneous energization is made possible in the interlocked operation with the other electronic apparatus.

In addition, if the terminals 211 and 221 are connected with each other through the switch 25 by the connecting device comprising the connectors 21A and 22A connected with each other through a manual switch or timer switch and the cords 24' and 25 as shown in FIG. 4, the on-off operation of the television receiver 11 can be remote-controlled by the switch 25. In this case, the current flowing in the switch 25 is so small that it does not damage the switch 25. Also, the voltage applied to the cord 24' required for remote control is a safe low voltage free from an electric shock, differing from the conventional household source voltage.

I claim:

1. An operatively-interlocked electronic system comprising:
   a first electronic apparatus including a first AC power supply, a rectifier circuit to which electric power is supplied from said first AC power supply, a first load circuit to which the output of said rectifier circuit is applied, a manual power switch inserted in the line connecting said first AC power supply to said first load circuit through said rectifier circuit, and a first generator circuit connected to said first AC power supply for decreasing the voltage of said AC power supply and generating a control signal;
   a second electronic apparatus including a second power supply, a secoond load circuit and a first automatic switch inserted between said second power supply and said second load circuit;
   means for applying the output signal from said signal generator circuit to said first automatic switch when said manual power switch is closed; and
   means for supplying electric power from said second power supply to said second load circuit by closing said first automatic switch in response to said control signal.

2. An operatively-interlocked electronic system comprising:
   a first electronic apparatus including a first AC power supply, a rectifier circuit, a manual power switch inserted between said first AC power supply and said rectifier circuit, a first load circuit to which a DC voltage generated in said rectifier circuit is applied, and a first control signal generator circuit connected through said manual power switch to said first AC power supply for decreasing the voltage from said AC power supply and generating a control signal;
   a second electronic apparatus including a second power supply, a second load circuit and a first automatic switch inserted between said second power supply and said second load circuit; and
   means for energizing said first automatic switch in response to an output signal from said first signal generator circuit,
   said first signal generator circuit producing the control signal when power is supplied to said first load circuit by closing said manual power switch, said first automatic switch of said second electronic apparatus being energized by said control signal, said second power supply applying power to said second load circuit of said second electronic apparatus.

3. An operatively-interlocked electronic system comprising:
   a first electronic apparatus including a first AC power supply, a transformer having a primary coil connected to said first AC supply, a first secondary coil and a second secondary coil, a rectifier circuit with an input terminal connected to said first secondary coil, a first load circuit to which a voltage obtained from said rectifier circuit is applied, a manual power switch inserted in the transmission line leading from said first secondary coil through said rectifier cirucit to said first load circuit, and a second switch coupled to the output terminal of said second secondary coil and interlocked with said manual power switch;

a second electronic apparatus including a second power supply, a second load circuit, and an automatic switch inserted between said second power supply and said second load circuit; and means for coupling said second secondary coil of said first electronic apparatus to said automatic switch through said second switch;

said automatic switch of said second electronic apparatus being responsive to a voltage generated in said second secondary coil when said first load circuit is supplied with power from said first AC power supply by closing said manual switch of said first electronic apparatus, said automatic switch being energized thereby to supply electric power from said second power supply to said second load circuit.

4. An operatively-interlocked electronic system according to claim 1, wherein said second electronic apparatus further comprises a second signal generator circuit for generating a control signal when electric power is supplied to said second load circuit;

said system further comprising a third electronic apparatus including a third power supply, a third load circuit, and a second automatic switch inserted between said third power supply and said third load circuit;

said system further comprising means for energizing said second automatic switch by applying the control signal from said second signal generator circuit to said second automatic switch;

said first automatic switch being energized and said second load circuit supplied with electric power in response to the control signal from said first signal generator circuit when said first load circuit is supplied with electric power by closing said manual switch of said first electronic apparatus, said second signal generator circuit producing the control signal upon the energization of said first automatic switch, said second automatic switch being energized thereby to supply power to said third load circuit in response to said control signal from said second signal generator circuit.

5. An operatively-interlocked electronic system according to claim 2, wherein said second electronic apparatus further comprises a second signal generator circuit for generating a control signal when electric power is supplied to said second load circuit;

said system further comprising a third electronic apparatus including a third power supply, a third load circuit, and a second automatic switch inserted between said third power supply and said third load circuit;

said system further comprising means for energizing said second automatic switch by applying the control signal from said second signal generator circuit to said second automatic switch;

said first automatic switch being energized and said second load circuit supplied with electric power in response to the control signal from said first signal generator circuit when said first load circuit is supplied with electric power by closing said manual switch of said first electronic apparatus, said second signal generator circuit producing the control signal upon the energization of said first automatic switch, said second automatic switch being energized thereby to supply power to said third load circuit in response to said control signal from said second signal generator circuit.

* * * * *